US008822576B2

(12) United States Patent
Taschner et al.

(10) Patent No.: US 8,822,576 B2
(45) Date of Patent: Sep. 2, 2014

(54) FLAME-RETARDANT PC/ABS COMPOSITIONS HAVING GOOD IMPACT STRENGTH, FLOWABILITY AND CHEMICAL RESISTANCE

(71) Applicant: Bayer Intellectual Property GmbH, Monheim (DE)

(72) Inventors: Vera Taschner, Köln (DE); Thomas Eckel, Dormagen (DE); Dieter Wittmann, Leverkusen (DE); Paul Klewpatinond, Bangkok (TH); Pierre Priest, Rayong (TH)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/627,631

(22) Filed: Sep. 26, 2012

(65) Prior Publication Data
US 2013/0079443 A1    Mar. 28, 2013

(30) Foreign Application Priority Data

Sep. 28, 2011  (EP) ..................... 11183074

(51) Int. Cl.
*C08L 69/00* (2006.01)
*C08L 51/06* (2006.01)
*C08L 25/12* (2006.01)
*C08L 51/04* (2006.01)
*C08L 55/02* (2006.01)

(52) U.S. Cl.
CPC .............. *C08L 69/00* (2013.01); *C08L 51/06* (2013.01); *C08L 25/12* (2013.01); *C08L 51/04* (2013.01); *C08L 55/02* (2013.01)
USPC .......................................... 524/127; 525/148

(58) Field of Classification Search
None
See application file for complete search history.

(56) References Cited

U.S. PATENT DOCUMENTS

| 5,087,524 A | 2/1992 | Krishnan et al. |
| 5,120,778 A | 6/1992 | Price et al. |
| 6,956,073 B2 * | 10/2005 | Takagi et al. ................. 524/127 |
| 2006/0287422 A1 * | 12/2006 | Volkers et al. ................ 524/417 |

FOREIGN PATENT DOCUMENTS

| EP | 0 063 769 A2 | 11/1982 |
| EP | 0 363 608 A1 | 4/1990 |
| EP | 0 494 602 A2 | 7/1992 |
| EP | 494602 A2 | 7/1992 |
| JP | 63156850 A | 6/1988 |
| JP | 08188708 A | 7/1996 |
| JP | 3212468 B2 | 9/2001 |
| JP | 2001294742 A | 10/2001 |

OTHER PUBLICATIONS

International Search Report of PCT/EP2012/069071 Completed on Jan. 9, 2013.

* cited by examiner

*Primary Examiner* — Ling Choi
*Assistant Examiner* — Catherine S Branch
(74) *Attorney, Agent, or Firm* — Miles and Stockbridge

(57) ABSTRACT

The present invention relates to flame resistant molding compositions comprising polycarbonates and graft polymers which, in addition to good flow properties, exhibit good (notched) impact strength and high chemical resistance with a UL94V-0 classification at 1.5 mm. These molding compositions are particularly suitable for thin-walled housing parts in the electrical and electronics sector.

17 Claims, No Drawings

FLAME-RETARDANT PC/ABS COMPOSITIONS HAVING GOOD IMPACT STRENGTH, FLOWABILITY AND CHEMICAL RESISTANCE

CROSS REFERENCE TO RELATED APPLICATION

This application claims priority to European Patent Application No. 11183074.1, filed Sep. 29, 2011, the content of which is incorporated herein by reference in its entirety.

BACKGROUND

1. Field of the Invention

The present invention relates to flame resistant moulding compositions comprising polycarbonates and graft polymers which, in addition to good flow properties, exhibit good (notched) impact strength and high chemical resistance with a UL94V-0 classification at 1.5 mm. These moulding compositions are particularly suitable for thin-walled housing parts in the electrical and electronics sector.

2. Description of Related Art

In U.S. Pat. No. 5,120,778, a flame retardant polycarbonate composition having improved impact strength is described, which contains polycarbonate resin, halogenated phthalimide and halogenated oligocarbonate as flame retardants, PTFE (polytetrafluoroethylene) as anti-dripping agent and a graft-modified olefin rubber, the graft-modified olefin rubber being a graft polymer of one or more unsaturated dicarboxylic acids or an acid anhydride thereof on an olefinic copolymer graft base.

From EP 494602 A2, pigmented, non-flame-retardant thermoplastic PC/ABS moulding compositions with 1-9% of a grafted olefinic copolymer are known, the grafted olefinic copolymer being a graft polymer of one or more unsaturated dicarboxylic acids or of the anhydride of the acid(s) on a skeleton comprising an olefinic copolymer.

In U.S. Pat. No. 5,087,524, thermoplastic resin compositions containing aromatic polycarbonate and 0.5-5% of an anhydride-containing modifier are described, but the specific anhydride-containing olefinic terpolymers and the compositions according to the present invention are not disclosed.

From the applications JP 2001294742 A, JP 08188708 A, JP 3212468 B2 and JP 63156850, non-flame retardant polycarbonate compositions containing ethylene-propylene-maleic anhydride copolymers are described.

SUMMARY

An object of the present invention was therefore to provide polycarbonate moulding compositions having good notched impact strength, flowability and chemical resistance together with good flame retardant properties.

Surprisingly, it has now been found that the above properties are obtainable if an ethylene-propylene-octene-maleic anhydride copolymer is used in flame retardant PC/ABS blends.

The moulding compositions thus constituted are advantageously distinguished by improved mechanical properties, such as high notched impact strength, in conjunction with good flowability and high chemical resistance, without displaying any negative effects on the flame retardant properties.

The present invention provides flame resistant, thermoplastic moulding compositions containing A) 50.0 to 90.0 parts by weight, preferably 52.0 to 80.0 parts by weight, particularly preferably 54.0 to 75.0 parts by weight of at least one aromatic polycarbonate, B) 4.0 to 14.0 parts by weight, preferably 5.0 to 12.0 parts by weight, particularly preferably 7.0 to 11.0 parts by weight of at least one graft polymer, C) 0.0-15.0 parts by weight, preferably 1.0-10.0 parts by weight, particularly preferably 2.0-8.0 parts by weight of vinyl (co)polymer), D) 1.0-20.0 parts by weight, preferably 5.0-18.0 parts by weight, more preferably 6.0-16.0 parts by weight, particularly preferably 9.0-15.0 parts by weight, of at least one phosphorus-containing flame retardant, E) 0.5 to 5.0 parts by weight, preferably 0.75 to 3.5 parts by weight, more preferably 0.5 to 2.5 parts by weight, particularly preferably 1.0 to 2.0 parts by weight, of at least one rubber-free anhydride-modified alpha-olefin terpolymer, F) 0.0 to 25.0 parts by weight, preferably 5.0 to 20.0 parts by weight, particularly preferably 12.0 to 18.0 parts by weight of at least one filler, G) 0-10.0 parts by weight, preferably 0.5-8.0 parts by weight, particularly preferably 1.0-6.0 parts by weight of other conventional additives, the sum of the parts by weight of components A) to F) adding up to 100 parts by weight.

DETAILED DESCRIPTION OF A PREFERRED EMBODIMENT

Particularly preferred moulding compositions contain as component G), in addition to other optional additives, a fluorinated polyolefin in an amount of 0.05 to 5.0 parts by weight, preferably 0.1 to 2.0 parts by weight, particularly preferably 0.3 to 1.0 parts by weight.

Particularly preferred moulding compositions contain as component G), in addition to other optional additives, a mould release agent, e.g. pentaerythritol tetrastearate, in an amount of 0.1 to 1.5 parts by weight, preferably 0.2 to 1.0 parts by weight, particularly preferably 0.3 to 0.8 parts by weight.

Particularly preferred moulding compositions contain as component G), in addition to other optional additives, at least one stabiliser, selected for example from the group of the sterically hindered phenols, phosphites and mixtures thereof and particularly preferably Irganox® B900, in an amount of 0.01 to 0.4 parts by weight, preferably 0.03 to 0.3 parts by weight, particularly preferably 0.06 to 0.2 parts by weight.

Furthermore, the combination of the three aforementioned additives, PTFE, pentaerythritol tetrastearate and Irganox B900, is particularly preferred as component G.

Component A

Aromatic polycarbonates and/or aromatic polyester carbonates according to component A that are suitable according to the invention are known from the literature or can be produced by processes that are known from the literature (for the production of aromatic polycarbonates, cf. e.g. Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates, e.g. DE-A 3 007 934).

The production of aromatic polycarbonates takes place e.g. by reacting diphenols with carbonic acid halides, preferably phosgene, and/or with aromatic dicarboxylic acid dihalides, preferably benzenedicarboxylic acid dihalides, by the interfacial polycondensation process, optionally using chain terminators, e.g. monophenols, and optionally using trifunctional or more than trifunctional branching agents, e.g. triphenols or tetraphenols. Production by means of a melt polymerisation process is also possible by reacting diphenols with e.g. diphenyl carbonate.

Diphenols for the production of aromatic polycarbonates and/or aromatic polyester carbonates are preferably those of formula (I)

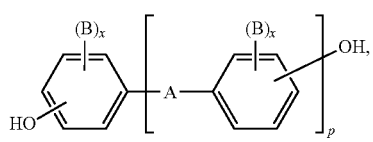

wherein

A denotes a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, on to which other aromatic rings optionally containing hetero atoms can be condensed, or a residue of formula (II) or (III)

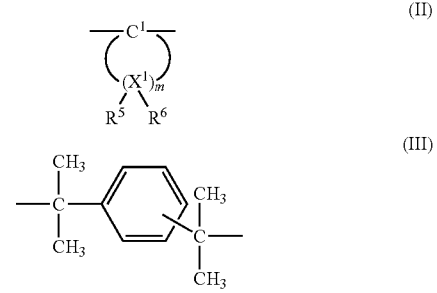

B denotes in each case $C_1$ to $C_{12}$ alkyl, preferably methyl, halogen, preferably chlorine and/or bromine x each independently of one another denotes 0, 1 or 2, p denotes 1 or 0, and R5 and R6 can be selected for each X1 individually and denote, independently of one another, hydrogen or C1 to C6 alkyl, preferably hydrogen, methyl or ethyl, X1 denotes carbon and m denotes a whole number from 4 to 7, preferably 4 or 5, with the proviso that, on at least one $X^1$ atom, $R^5$ and $R^6$ are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxy-phenyl) sulfoxides, bis(hydroxyphenyl) ketones, bis(hydroxyphenyl) sulfones and α,α-bis(hydroxyphenyl) diisopropylbenzenes and the ring-brominated and/or ring-chlorinated derivatives thereof.

Particularly preferred diphenols are 4,4'-dihydroxydiphenyl, bisphenol A, 2,4-bis(4-hydroxy-phenyl)-2-methylbutane, 1,1-bis(4-hydroxyphenyl)cyclohexane, 1,1-bis(4-hydroxyphenyl)-3.3.5-trimethylcyclohexane, 4,4'-dihydroxydiphenyl sulfide, 4,4'-dihydroxydiphenyl sulfone and the di- and tetrabrominated or chlorinated derivatives thereof, such as e.g. 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is particularly preferred.

The diphenols can be used individually or as any mixtures. The diphenols are known from the literature or are obtainable by processes that are known from the literature.

For the production of thermoplastic, aromatic polycarbonates, suitable chain terminators are e.g. phenol, p-chlorophenol, p-tert.-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols with a total of 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used is generally between 0.5 mole % and 10 mole %, based on the molar sum of the diphenols used in each case.

The thermoplastic, aromatic polycarbonates have average weight average molecular weights (Mw, measured by GPC (gel permeation chromatography with polycarbonate standard) of 10,000 to 200,000 g/mol, preferably 15,000 to 80,000 g/mol, particularly preferably 24,000 to 32,000 g/mol.

The thermoplastic, aromatic polycarbonates can be branched in a known manner, preferably by incorporating 0.05 to 2.0 mole %, based on the sum of diphenols used, of trifunctional or more than trifunctional compounds, e.g. those with three and more phenolic groups. Linear polycarbonates are preferably used, more preferably those based on bisphenol A.

Both homopolycarbonates and copolycarbonates are suitable. For the production of copolycarbonates according to component A according to the invention, it is also possible to use 1 to 25 wt. %, preferably 2.5 to 25 wt. %, based on the total quantity of diphenols to be used, of polydiorganosiloxanes with hydroxyaryloxy end groups. These are known (U.S. Pat. No. 3,419,634) and can be produced by processes that are known in the literature. Also suitable are polydiorganosiloxane-containing copolycarbonates; the production of polydiorganosiloxane-containing copolycarbonates is described e.g. in DE-A 3 334 782.

Preferred polycarbonates are, in addition to bisphenol A homopolycarbonates, the copolycarbonates of bisphenol A with up to 15 mole %, based on the molar sums of diphenols, of other diphenols mentioned as preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates, a carbonic acid halide, preferably phosgene, is additionally used as a bifunctional acid derivative.

As chain terminators for the production of the aromatic polyester carbonates, in addition to the already mentioned monophenols, their chlorocarbonic acid esters and the acid chlorides of aromatic monocarboxylic acids, which may optionally be substituted by C1 to C22 alkyl groups or by halogen atoms, as well as aliphatic C2 to C22 monocarboxylic acid chlorides, are also suitable.

The quantity of chain terminators is in each case 0.1 to 10 mole %, based in the case of phenolic chain terminators on moles of diphenol and in the case of monocarboxylic acid chloride chain terminators on moles of dicarboxylic acid dichloride.

In the production of aromatic polyester carbonates, it is additionally possible to use one or more aromatic hydroxycarboxylic acids.

The aromatic polyester carbonates can be both linear and branched in a known manner (cf. DE-A 2 940 024 and DE-A 3 007 934), with linear polyester carbonates being preferred.

As branching agents it is possible to use e.g. trifunctional or polyfunctional carboxylic acid chlorides, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in quantities of 0.01 to 1.0 mole % (based on dicarboxylic acid dichlorides used) or trifunctional or polyfunctional phenols, such as phloroglucinol, 4,6-dimethyl-2,4,6-tri(4-hydroxyphenyl) hept-2-ene, 4,6-dimethyl-2,4-6-tri(4-hydroxyphenyl)heptane, 1,3,5-tri-(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in quantities of 0.01 to 1.0 mole % based on diphenols used. Phenolic branching agents can be charged together with the diphenols; acid chloride branching agents can be introduced together with the acid dichlorides.

In the thermoplastic, aromatic polyester carbonates, the proportion of carbonate structural units can vary at will. The proportion of carbonate groups is preferably up to 100 mole %, in particular up to 80 mole %, particularly preferably up to 50 mole %, based on the sum of ester groups and carbonate groups. Both the ester and the carbonate portion of the aromatic polyester carbonates can be present in the form of blocks or randomly distributed in the polycondensate.

The thermoplastic, aromatic polycarbonates and polyester carbonates can be used individually or in any mixture.

Component B

The graft polymers B comprise e.g. graft polymers with rubber-elastic properties, which are substantially obtainable from at least 2 of the following monomers: chloroprene, 1,3-butadiene, isoprene, styrene, acrylonitrile, ethylene, propylene, vinyl acetate and (meth)acrylic acid esters with 1 to 18 C atoms in the alcohol component; i.e. polymers as described e.g. in "Methoden der Organischen Chemie" (Houben-Weyl), vol. 14/1, Georg Thieme-Verlag, Stuttgart 1961, pp. 393-406 and in C. B. Bucknall, "Toughened Plastics", Appl. Science Publishers, London 1977.

Preferred polymers B are partially crosslinked and possess gel contents (measured in toluene) of more than 20 wt. %, preferably more than 40 wt. %, in particular more than 60 wt. %.

The gel content is determined at 25° C. in a suitable solvent (M. Hoffmann, H. Krömer, R. Kuhn, Polymeranalytik I and II, Georg Thieme-Verlag, Stuttgart 1977).

Preferred graft polymers B comprise graft polymers of:

B.1) 5 to 95, preferably 30 to 80 parts by weight, of a mixture of

B.1.1) 50 to 95 parts by weight styrene, α-methylstyrene, methyl ring-substituted styrene, C1-C8 alkyl methacrylate, in particular methyl methacrylate, C1-C8 alkyl acrylate, in particular methyl acrylate, or mixtures of these compounds and B.1.2) 5 to 50 parts by weight acrylonitrile, methacrylonitrile C1-C8 alkyl methacrylates, in particular methyl methacrylate, C1-C8 alkyl acrylate, in particular methyl acrylate, maleic anhydride, C1-C4 alkyl- or phenyl-N-substituted maleimides or mixtures of these compounds on B.2) 5 to 95, preferably 20 to 70 parts by weight of a rubber-containing graft base.

The graft base preferably has a glass transition temperature of less than −10° C.

Particularly preferred is a graft base based on a polybutadiene rubber.

Preferred graft polymers B are e.g. polybutadienes, butadiene/styrene copolymers and acrylate rubbers grafted with styrene and/or acrylonitrile and/or (meth)acrylic acid alkyl esters; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkyl styrenes, as described e.g. in DE-OS 2 348 377 (=U.S. Pat. No. 3,919,353).

Particularly preferred graft polymers B are graft polymers which are obtainable by a graft-reaction of I. 10 to 70, preferably 15 to 50, in particular 20 to 40 wt. %, based on graft product, of at least one (meth)acrylic acid ester or 10 to 70, preferably 15 to 50, in particular 20 to 40 wt. % of a mixture of 10 to 50, preferably 20 to 35 wt. %, based on the mixture, of acrylonitrile or (meth)acrylic acid ester and 50 to 90, preferably 65 to 80 wt. %, based on the mixture, of styrene on II. 30 to 90, preferably 40 to 85, in particular 50 to 80 wt. %, based on graft product, of a butadiene polymer with at least 50 wt. %, based on II, of butadiene residues as graft base.

The gel content of this graft base II is preferably at least 70 wt. % (measured in toluene), the degree of grafting G 0.15 to 0.55 and the average particle diameter d50 of the graft polymer B 0.05 to 2, preferably 0.1 to 0.6 μm.

(Meth)acrylic acid esters I are esters of acrylic acid or methacrylic acid and monohydric alcohols having 1 to 18 C atoms. Particularly preferred are methacrylic acid methyl ester, ethyl ester and propyl ester.

The graft base II can contain, in addition to butadiene residues, up to 50 wt. %, based on II, of residues of other ethylenically unsaturated monomers, such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred graft base II consists of pure polybutadiene.

Since it is known that, during the graft reaction, the graft monomers are not necessarily grafted on to the graft base completely, graft polymers B according to the invention are also understood to mean those products that are obtained by polymerisation of the graft monomers in the presence of the graft base.

The degree of grafting G refers to the weight ratio of grafted monomers to graft base and is dimensionless.

The average particle size d50 is the diameter above and below which 50 wt. % of the particles lie. It can be determined by means of ultracentrifuge measurements (W. Scholtan, H. Lange, Kolloid, Z. and Z. Polymere 250 (1972), 782-796).

The glass transition temperature is determined by dynamic differential thermal analysis (DSC) according to the standard DIN EN 61006 at a rate of heating of 10 K/min with the Tg being defined as the mid point temperature (tangent method).

Other preferred graft polymers B are e.g. also graft polymers of
(a) 20 to 90 wt. %, based on B, of acrylate rubber as graft base and
(b) 10 to 80 wt. %, based on B, of at least one polymerisable, ethylenically unsaturated monomer, the homopolymers or copolymers of which obtained in the absence of a) would have a glass transition temperature of more than 25° C., as graft monomers.

The graft base of acrylate rubber preferably has a glass transition temperature of less than −20° C., preferably less than −30° C.

The acrylate rubbers (a) of the polymers B are preferably polymers of acrylic acid alkyl esters, optionally with up to 40 wt. %, based on (a), of other polymerisable, ethylenically unsaturated monomers. The preferred polymerisable acrylic acid esters include C1-C8 alkyl esters, e.g. methyl, ethyl, n-butyl, n-octyl and 2-ethylhexyl esters, and mixtures of these monomers.

For the purpose of crosslinking, monomers with more than one polymerisable double bond can be copolymerised. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as e.g. ethylene glycol dimethacrylate, allyl methacrylate; polyunsaturated heterocyclic compounds, such as e.g. trivinyl and triallyl cyanurate; polyfunctional vinyl compounds, such as di- and trivinylbenzenes; but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallyl benzenes.

The quantity of the crosslinking monomers is preferably 0.02 to 5, in particular 0.05 to 2 wt. %, based on graft base (a).

In the case of cyclic crosslinking monomers with at least 3 ethylenically unsaturated groups, it is advantageous to limit the quantity to less than 1 wt. % of the graft base (a).

Preferred "other" polymerisable, ethylenically unsaturated monomers which can optionally be used together with the acrylic acid esters for the production of the graft base (a) are e.g. acrylonitrile, styrene, α-methylstyrene, acrylamides, vinyl-C1-C6-alkyl ethers, methyl methacrylate and butadiene. Preferred acrylate rubbers as graft base (a) are emulsion polymers having a gel content of at least 60 wt. %.

Other suitable graft bases are silicone rubbers with graft-linking sites and a gel content of at least 40% (measured in dimethyl formamide), as described in the Offenlegungsschriften DE 37 04 657, DE 37 04 655, DE 36 31 540 and DE 36 31 539.

Component C

Component C comprises one or more thermoplastic vinyl (co)polymers.

Suitable as vinyl (co)polymers are polymers of at least one monomer from the group of the vinyl aromatics, vinyl cyanides (unsaturated nitriles), (meth)acrylic acid (C1-C8) alkyl esters, unsaturated carboxylic acids and derivatives (such as anhydrides and imides) of unsaturated carboxylic acids. Particularly suitable are (co)polymers of C.1.1 50 to 99, preferably 60 to 80 parts by weight of vinyl aromatics and/or ring-substituted vinyl aromatics, such as styrene, α-methylstyrene, p-methylstyrene, p-chlorostyrene, and/or (meth)acrylic acid (C1-C8) alkyl esters, such as methyl methacrylate, ethyl methacrylate), and C.1.2 1 to 50, preferably 20 to 40 parts by weight of vinyl cyanides (unsaturated nitriles), such as acrylonitrile and methacrylonitrile, and/or (meth)acrylic acid (C1-C8) alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, e.g. maleic anhydride and N-phenylmaleimide).

The vinyl (co)polymers are resinous, thermoplastic and rubber-free. The copolymer particularly preferably comprises C.1.1 styrene and C.1.2 acrylonitrile.

The (co)polymers according to C are known and can be produced by free-radical polymerisation, in particular by emulsion, suspension, solution or bulk polymerisation. The (co)polymers preferably possess average molecular weights Mw (weight average, determined by light scattering or sedimentation) of between 15,000 and 200,000 g/mol, particularly preferably between 100,000 and 150,000 g/mol.

In a particularly preferred embodiment, C is a copolymer of 77 wt. % styrene and 23 wt. % acrylonitrile with a weight average molecular weight Mw of 130,000 g/mol.

Component D

Phosphorus-containing flame retardants D within the meaning of the invention are preferably selected from the groups of the monomeric and oligomeric phosphoric and phosphonic acid esters, phosphonate amines and phosphazenes, with the use of mixtures of several components selected from one or various of these groups as flame retardants also being possible. Other halogen-free phosphorus compounds not specifically mentioned here can also be used individually or in any combination with other halogen-free phosphorus compounds.

Preferred monomeric and oligomeric phosphoric and phosphonic acid esters are phosphorus compounds of the general formula (V)

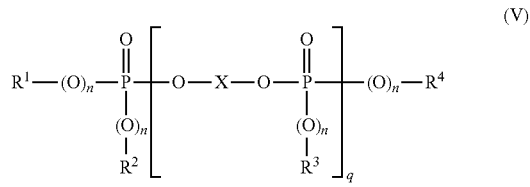

wherein

R1, R2, R3 and R4, independently of one another, each denote optionally halogenated C1 to C8 alkyl, C5 to C6 cycloalkyl, C6 to C20 aryl or C7 to C12 aralkyl each optionally substituted by alkyl, preferably C1 to C4 alkyl, and/or halogen, preferably chlorine, bromine, n independently of one another, denotes 0 or 1, q denotes 0 to 30 and X denotes a mononuclear or polynuclear aromatic residue with 6 to 30 C atoms or a linear or branched aliphatic residue with 2 to 30 C atoms, which can be OH-substituted and can contain up to eight ether bonds.

R1, R2, R3 and R4, independently of one another, preferably denote C1 to C4 alkyl, phenyl, naphthyl or phenyl C1-C4 alkyl. The aromatic groups R1, R2, R3 and R4 can themselves be substituted with halogen and/or alkyl groups, preferably chlorine, bromine and/or C1 to C4 alkyl. Particularly preferred aryl residues are cresyl, phenyl, xylenyl, propylphenyl or butylphenyl and the corresponding brominated and chlorinated derivatives thereof.

X in formula (V) preferably signifies a mononuclear or polynuclear aromatic residue with 6 to 30 C atoms. This is preferably derived from diphenols of formula (I).

n in formula (V) can, independently of one another, be 0 or 1; n is preferably equal to 1.

q denotes whole numbers from 0 to 30, preferably 0 to 20, particularly preferably 0 to 10, and in the case of mixtures average values from 0.8 to 5.0, preferably 1.0 to 3.0, more preferably 1.05 to 2.00, and particularly preferably from 1.08 to 1.60.

X particularly preferably denotes

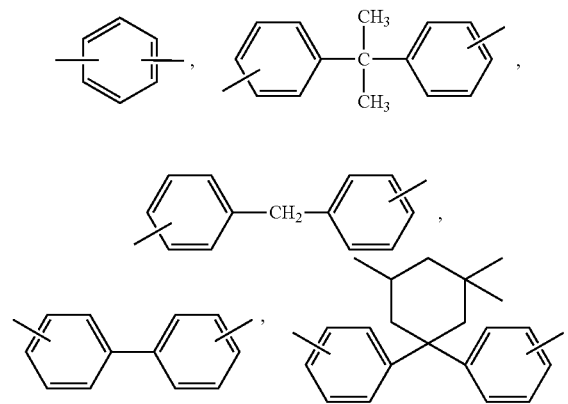

or the chlorinated or brominated derivatives thereof, and in particular X is derived from resorcinol, hydroquinone, bisphenol A or diphenylphenol. Particularly preferably, X is derived from bisphenol A.

Phosphorus compounds of formula (V) are in particular tributyl phosphate, triphenyl phosphate, tricresyl phosphate, diphenyl cresyl phosphate, diphenyl octyl phosphate, diphenyl-2-ethylcresyl phosphate, tri(isopropylphenyl)phosphate, resorcinol bridged oligophosphate and bisphenol A bridged oligophosphate. The use of oligomeric phosphoric acid esters of formula (V) derived from bisphenol A is particularly preferred.

Most preferred as component D is bisphenol A based oligophosphate according to formula (Va).

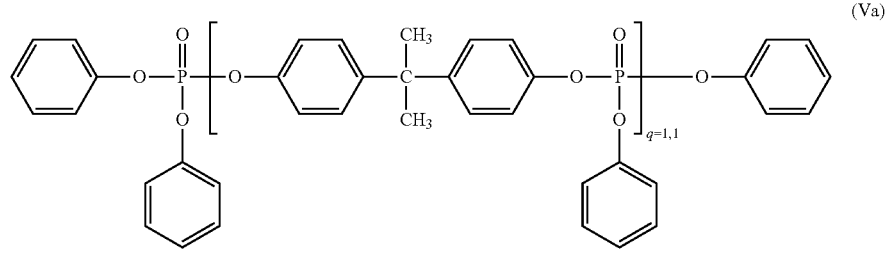

The phosphorus compounds according to component D are known (cf. e.g. EP-A 0 363 608, EP-A 0 640 655) or can be produced by known methods in an analogous manner (e.g. Ullmanns Enzyklopädie der technischen Chemie, vol. 18, pp. 301 ff. 1979; Houben-Weyl, Methoden der organischen Chemie, vol. 12/1, p. 43; Beilstein vol. 6, p. 177).

As component D according to the invention, it is also possible to use mixtures of phosphates with different chemical structures and/or with the same chemical structure and different molecular weights.

Mixtures with the same structure and different chain lengths are preferably used, the q value stated being the average q value. The average q value is determined by determining the composition of the phosphorus compound (molecular weight distribution) using high pressure liquid chromatography (HPLC) at 40° C. in a mixture of acetonitrile and water (50:50) and calculating the average values for q therefrom.

Furthermore, phosphonate amines and phosphazenes, as described in WO 00/00541 and WO 01/18105, can be used as flame retardants.

The flame retardants can be used individually or in any mixture with one another or in a mixture with other flame retardants.

If the compositions according to the invention are provided with flame retardants, an anti-dripping agent, preferably polytetrafluoroethylene (PTFE), is preferably also contained.

Component E

Component E within the meaning of the present invention is a rubber-free anhydride-modified alpha-olefin terpolymer, the anhydride being an unsaturated carboxylic acid anhydride.

The anhydride is preferably selected from the group comprising maleic anhydride, phthalic anhydride, fumaric anhydride and itaconic anhydride and mixtures thereof.

The anhydride is particularly preferably maleic anhydride.

The alpha-olefin terpolymer preferably contains building blocks selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene and mixtures of these.

The terpolymer particularly preferably contains ethylene, 1-propene and 1-octene as building blocks.

The rubber-free anhydride-modified terpolymer is characterised in that the composition contains E1) 90.0-98.0 wt.-%, preferably 92.0-97.5 wt. %, particularly preferably 94.0-97.0 wt. % terpolymer and E2) 2.0-10.0 wt. %, preferably 2.5-8.0 wt. %, and particularly preferably 3.0-6.0 wt. % anhydride.

The rubber-free anhydride-modified terpolymer preferably has a molecular weight Mw of 2000-10000 g/mol, preferably 2500-8000 g/mol, particularly preferably 3000-6000 g/mol determined by GPC (gel permeation chromatography) in trichlorobenzene as solvent with polystyrene as standard.

The olefinic part E1) of the anhydride-modified terpolymer is preferably characterised in that the ethylene portion is 96.0-80.0 wt. %, more preferably 92.0-84.0 wt. %;

the propylene portion is 2.0-10.0 wt. %, more preferably 4.0-8.0 wt. %; and the octene portion is 2.0-10.0 wt. %, more preferably 4.0-8.0 wt. %.

Component F)

Component F comprises reinforcing and non-reinforcing fillers. Examples of reinforcing fillers are glass beads, mica, silicates, quartz, talcum, titanium dioxide, wollastonite and pyrogenic or precipitated silicas with BET surface areas of at least 50 m2/g (according to DIN 66131/2).

The above silica fillers can be hydrophilic by nature or can be made water repellent by known methods. Reference is made in this connection e.g. to the German Offenlegungsschrift DE 38 39 900 A1, the disclosure of which relating to this is intended to be part of the present application.

Examples of non-reinforcing fillers are silica flour, diatomaceous earth, calcium silicate, zirconium silicate, zeolites, metal oxide powders, such as aluminium, titanium, iron or zinc oxide, barium silicate, barium sulfate, calcium carbonate, gypsum and polytetrafluoroethylene powder.

Furthermore, fibrous components, such as glass fibres and synthetic fibres, can be used as reinforcing fillers. The BET surface area of these fillers is preferably less than 50 m2/g (according to DIN 66131/2).

Preferred fillers and reinforcing materials are talc, glass fibres, silicates, quartz, titanium dioxide and wollastonite.

Talc is particularly preferred as a filler.

In an alternative embodiment, extremely fine particle size inorganic powders can be used, which preferably consist of at least one polar compound of one or more metals from main groups 1 to 5 or subgroups 1 to 8 of the periodic table, preferably main groups 2 to 5 or subgroups 4 to 8, particularly preferably main groups 3 to 5 or subgroups 4 to 8, with at least one element selected from oxygen, hydrogen, sulfur, phosphorus, boron, carbon, nitrogen or silicon.

Preferred compounds are e.g. oxides, hydroxides, hydrated oxides, sulfates, sulfites, sulfides, carbonates, carbides, nitrates, nitrites, nitrides, borates, silicates, phosphates, hydrides, phosphites or phosphonates.

The extremely fine particle size inorganic powders preferably consist of oxides, phosphates, hydroxides, preferably of TiO2, SiO2, SnO2, ZnO, ZnS, boehmite, ZrO2, Al2O3, aluminium phosphates, iron oxides, and also TiN, WC, AlO(OH), Sb2O3, iron oxides, NaSO4, vanadium oxides, zinc borate, silicates such as Al silicates, Mg silicates, one-, two- and three-dimensional silicates. Mixtures and doped compounds can likewise be used.

Moreover, these nanoscale particles can be surface modified with organic molecules to achieve better compatibility with the polymers. In this way, water-repellent or hydrophilic surfaces can be produced.

Particularly preferred are hydrate-containing aluminium oxides, e.g. boehmite, or TiO2.

The average particle diameters of the nanoparticles are less than or equal to 200 nm, preferably less than or equal to 150 nm, in particular 1 to 100 nm.

Particle size and particle diameter always refer to the average particle diameter d50, determined by ultracentrifuge measurements in accordance with W. Scholtan et al., Kolloid-Z. and Z. Polymere 250 (1972), pp. 782-796.

The inorganic compounds can be present as powders, pastes, sols, dispersions or suspensions. Powders can be obtained by precipitation from dispersions, sols or suspensions.

The powders can be incorporated into the thermoplastic moulding compositions by conventional methods, e.g. by direct kneading or extrusion of moulding compositions and the extremely fine particle size inorganic powders. Preferred methods are the production of a masterbatch, e.g. in flame retardant additives and at least one component of the moulding compositions according to the invention in monomers or solvents, or the coprecipitation of a thermoplastic component and the extremely fine particle size inorganic powders, e.g. by coprecipitation of an aqueous emulsion and the extremely fine particle size inorganic powders, optionally in the form of dispersions, suspensions, pastes or sols of the extremely fine particle size inorganic materials.

Component G (Further Additives)

The composition can contain further conventional polymer additives, such as flame retardant synergists, anti-dripping agents (e.g. compounds of the classes of substances of the fluorinated polyolefins, the silicones and aramid fibres), lubricants and mould release agents (e.g. pentaerythritol tetrastearate), nucleating agents, stabilisers, antistatic agents (e.g. conductive carbon blacks, carbon fibres, carbon nanotubes and organic antistatic agents such as polyalkylene ethers, alkyl sulfonates or polyamide-containing polymers) as well as dyes and pigments.

As anti-dripping agents, in particular polytetrafluoroethylene (PTFE) or PTFE-containing compositions, such as e.g. masterbatches of PTFE with styrene- or methyl methacrylate-containing polymers or copolymers, are used as a powder or as a coagulated mixture, e.g. with component B.

The fluorinated polyolefins used as anti-dripping agents are of high molecular weight and possess glass transition temperatures of more than −30° C., generally more than 100° C., fluorine contents, preferably of 65 to 76, in particular 70 to 76 wt. %, average particle diameters d50 of 0.05 to 1000, preferably 0.08 to 20 μm. In general, the fluorinated polyolefins have a density of 1.2 to 2.3 g/cm3. Preferred fluorinated polyolefins are polytetrafluoroethylene, polyvinylidene fluoride, tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, pp. 484-494; "Fluorpolymers" by Wall, Wiley-Interscience, John Wiley & Sons, Inc., New York, vol. 13, 1970, pp. 623-654; "Modern Plastics Encyclopedia", 1970-1971, vol. 47, No. 10 A, October 1970, McGraw-Hill, Inc., New York, pages 134 and 774; "Modern Plastics Encyclopedia", 1975-1976, October 1975, vol. 52, No. 10 A, McGraw-Hill, Inc., New York, pages 27, 28 and 472 and U.S. Pat. Nos. 3,671,487, 3,723,373 and 3 838 092).

They can be produced by known methods, e.g. by polymerisation of tetrafluoroethylene in an aqueous medium with a free-radical-forming catalyst, e.g. sodium, potassium or ammonium peroxydisulfate under pressures of 7 to 71 kg/cm2 and at temperatures of 0 to 200° C., preferably at temperatures of 20 to 100° C. (For further details, see e.g. U.S. Pat. No. 2,393,967). Depending on the form in which they are used, the density of these materials can be between 1.2 and 2.3 g/cm3 and the average particle size between 0.05 and 1000 μm.

The preferred fluorinated polyolefins according to the invention have average particle diameters of 0.05 to 20 μm, preferably 0.08 to 10 μm, and a density of 1.2 to 1.9 g/cm3.

Suitable fluorinated polyolefins D that can be used in powder form are tetrafluoroethylene polymers with average particle diameters of 100 to 1000 μm and densities of 2.0 g/cm3 to 2.3 g/cm3. Suitable tetrafluoroethylene polymer powders are commercial products and are sold e.g. by DuPont with the trade name Teflon®.

As stabilisers according to component G, preferably sterically hindered phenols and phosphites or mixtures thereof are used, such as e.g. Irganox© B900 (BASF). Pentaerythritol tetrastearate is preferably used as a mould release agent.

The moulding compositions according to the invention, containing components A to F and optionally other known additives G, such as stabilisers, dyes, pigments, lubricants and mould release agents, nucleating agents and antistatic agents, are produced by mixing the respective constituents in a known manner and melt compounding or melt extruding at temperatures of 200° C. to 330° C. in conventional equipment such as internal mixers, extruders and twin screw extruders.

The present invention therefore also provides a process for the production of thermoplastic moulding compositions containing components A to F and optionally additives G, which, after mixing, are melt compounded or melt extruded at temperatures of 200 to 330° C. in conventional equipment.

The mixing of the individual constituents can take place in a known manner, both successively and simultaneously, and both at about 20° C. (room temperature) and at a higher temperature.

The moulding compositions of the present invention can be used for the production of mouldings of all kinds. In particular, mouldings can be produced by injection moulding. Examples of mouldings that can be produced are: housing parts of all kinds, e.g. for domestic appliances such as TV and hi-fi units, coffee machines, mixers, office equipment, such as monitors or printers, or cover plates for the construction sector and parts for the automotive sector. They are also used in the field of electrical engineering, because they have very good electrical properties.

The moulding compositions are particularly suitable for the production of thin-walled housing parts in the electrical and electronics sector.

Another form of processing is the production of mouldings by blow moulding or by thermoforming from previously produced sheets or films.

Production and testing of the moulding compositions

Using a twin screw extruder (ZSK-25) (Werner and Pfleiderer), the materials listed in Table for Table 2, respectively, are compounded and pelleted at a speed of 225 rpm and a throughput of 20 kg/h at a machine temperature of 260° C. The finished pellets are processed on an injection moulding machine to form the corresponding specimens (melt temperature 240° C., mould temperature 80° C., flow front velocity 240 mm/s).

The following methods were used to characterise the properties of the specimens:

The flowability was determined in accordance with ISO 11443 (melt viscosity).

The notched impact strength ak was measured in accordance with ISO 180/1A on a notched single gated specimen with dimensions of 80×10×4 mm.

The impact strength ak was measured in accordance with ISO 180/1U on an unnotched single gated specimen with dimensions of 80×10×4 mm.

The melt flow behaviour (MVR) was evaluated using the melt volume flow rate (MVR) measured in accordance with ISO 1133 at a temperature of 240° C. and with a 5 kg load.

The fire behaviour was measured in accordance with UL 94V on specimens with dimensions of 127×12.7×1.5 mm.

The ESC behaviour was measured in accordance with ISO 4599 (Environmental Stress Cracking (ESC) test) with 2.4% outer fibre strain in Energol HLP-150 hydraulic oil or in toluene/isopropanol 60:40, respectively.

The following examples serve to explain the invention further.

Component A1

Linear polycarbonate based on bisphenol A with a weight average molecular weight Mw of 27500 g/mol (determined by GPC in dichloromethane with polycarbonate as standard).

Component A-2

Linear polycarbonate based on bisphenol A with a weight average molecular weight Mw of 20000 g/mol (determined by GPC in dichloromethane with polycarbonate as standard).

Component B-1

ABS graft polymer with core-shell structure, produced by emulsion polymerisation of 50 wt. %, based on the ABS polymer, of a mixture of 33 wt. % acrylonitrile and 67 wt. % styrene in the presence of 50 wt. %, based on the ABS polymer, of a particulate crosslinked polybutadiene-styrene rubber (styrene content of the rubber: 10%) (average particle diameter d50=0.32 µm).

Component B-2

ABS graft polymer with core-shell structure, produced by emulsion polymerisation of 43 wt. %, based on the ABS polymer, of a mixture of 27 wt. % acrylonitrile and 73 wt. % styrene in the presence of 57 wt. %, based on the ABS polymer, of a particulate, crosslinked polybutadiene rubber (average particle diameter d50=0.35 µm).

Component B-3

ABS polymer produced by bulk polymerisation of 82 wt. %, based on the ABS polymer, of a mixture of 24 wt. % acrylonitrile and 76 wt. % styrene in the presence of 18 wt. %, based on the ABS polymer, of a polybutadiene-styrene block copolymer rubber with a styrene content of 26 wt. %. The weight average molecular weight Mw of the free SAN copolymer portion in the ABS polymer is 80000 g/mol (measured by GPC in THF). The gel content of the ABS polymer is 24 wt. % (measured in acetone).

Component C

Copolymer of 77 wt. % styrene and 23 wt. % acrylonitrile with a weight average molecular weight Mw of 130000 g/mol (determined by GPC), produced by the bulk process.

Component D

Bisphenol A-Based Oligophosphate

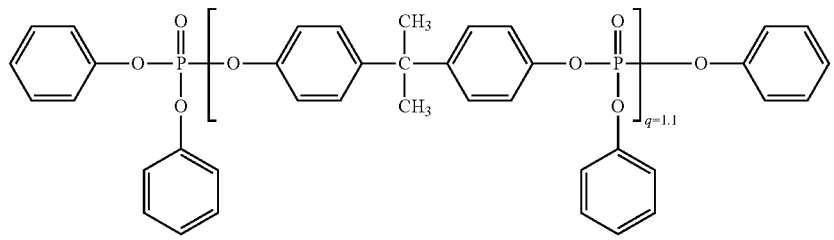

Component E

Ethylene-propylene-octene-maleic anhydride copolymer (ethylene:propylene:octene 87:6:7), CAS no. 31069-12-2, with molecular weight Mw 5000 g/mol, density 940 kg/m$^3$, acid value 60 mg KOH/g, maleic anhydride portion 4.4% based on the copolymer E.

Component F

HTP Ultra 5C, talc from Imifabi S.p.A. with an MgO content of 31 wt. %, an SiO2 content of 61.5 wt. % and an Al2O3 content of 0.4 wt. %. Particle size d50 of 1.3 μm.

Component G-1

Coagulated mixture of emulsions of fluorinated polyolefins with emulsions of a copolymer based on styrene-acrylonitrile (Cyclolac INP 449 from Sabic).

Component G-1a

CFP 6000 N, polytetrafluoroethylene powder (manufacturer: Du Pont, Geneva, Switzerland)

Component G-2

Pentaerythritol Tetrastearate as Lubricant/Mould Release Agent

Component G-3

Phosphite stabiliser, Irganox® B900 (mixture of 80% Irgafos® 168 and 20% Irganox® 1076; BASF AG; Ludwigshafen/Irgafos® 168 (tris(2,4-di-tert-butylphenyl)phosphite)/Irganox® 1076 (2,6-di-tert-butyl-4-(octadecanoxycarbonylethyl)phenol)

TABLE 1

Composition and properties of the moulding compositions

| | Unit | 1 (comp.) | 2 | 3 | 4 (comp.) |
|---|---|---|---|---|---|
| Formulation | | | | | |
| Component A-1 | % | 58 | 57 | 56 | 55 |
| Component B-1 | % | 9.7 | 9.7 | 9.7 | 9.7 |
| Component C | % | 3 | 3 | 3 | 3 |
| Component D | % | 13 | 13 | 13 | 13 |
| Component E | % | 0 | 1 | 2 | 3 |
| Component F | % | 15 | 15 | 15 | 15 |
| Component G-1 | % | 0.8 | 0.8 | 0.8 | 0.8 |
| Component G-2 | % | 0.4 | 0.4 | 0.4 | 0.4 |
| Component G-3 | % | 0.1 | 0.1 | 0.1 | 0.1 |
| Measurements | | | | | |
| ak (ISO 180/1A) 240° C./RT | kJ/m$^2$ | 7 | 12 | 21 | 28 |
| Impact strength (ISO 180/1U) 240° C./RT | kJ/m$^2$ | 97 | 136 | 174 | 168 |
| Melt viscosity 260° C. [1000 s$^{-1}$] | Pas | 181 | 178 | 174 | 145 |
| Melt viscosity 260° C. [1500 s$^{-1}$] | Pas | 150 | 148 | 143 | 121 |
| MVR 240° C./5 kg | cm$^3$/10 min | 10 | 10 | 10 | 10 |
| ESC in Energol HLP-150 hydraulic oil with 2.4% outer fibre strain: Time to failure | h | 41 | 70 | 143 | >168 |
| UL 94 V 1.5 mm evaluation | | V-0 | V-0 | V-0 | V-1 |
| UL 94 V 1.5 mm total after-flame time | s | 13 | 18 | 34 | 66 |

It can be seen from Table 1 that the compositions of Examples 2 and 3 with 1%-2% ethylene-propylene-maleic anhydride copolymer achieve the object of the invention, i.e. a combination of good (notched) impact strength, flowability and chemical resistance, with a UL94V-0 classification at 1.5 mm.

TABLE 2

Composition and properties of the moulding compositions

| | Unit | 5 (comp.) | 6 | 7 | 8 | 9 (comp.) |
|---|---|---|---|---|---|---|
| Formulation | | | | | | |
| Component A-1 | % | 38.5 | 38.5 | 38.5 | 38.5 | 38.5 |
| Component A-2 | % | 33.4 | 33.4 | 33.4 | 33.4 | 33.4 |
| Component B-2 | % | 4.9 | 4.9 | 4.9 | 4.9 | 4.9 |
| Component B-3 | % | 5.6 | 5.6 | 5.6 | 5.6 | 5.6 |
| Component C | % | 7.4 | 6.4 | 5.9 | 5.4 | 4.4 |
| Component D | % | 9.4 | 9.4 | 9.4 | 9.4 | 9.4 |
| Component E | % | 0 | 1 | 1.5 | 2 | 3 |
| Component G-1a | % | 0.3 | 0.3 | 0.3 | 0.3 | 0.3 |
| Component G-2 | % | 0.4 | 0.4 | 0.4 | 0.4 | 0.4 |
| Component G-3 | % | 0.1 | 0.1 | 0.1 | 0.1 | 0.1 |
| Measurements | | | | | | |
| ak (ISO 180/1A) 240° C./RT | kJ/m$^2$ | 13 | 16 | 17 | 17 | 27 |
| Melt viscosity 260° C. [1000 s$^{-1}$] | Pas | 163 | 157 | 147 | 131 | 91 |
| Melt viscosity 260° C. [1500 s$^{-1}$] | Pas | 132 | 126 | 120 | 109 | 77 |
| MVR 240° C./5 kg | cm$^3$/10 min | 24 | 26 | 27 | 30 | 31 |
| ESC in toluene/isopropanol 60:40 with 2.4% outer fibre strain: Time to failure | min:sec | 2:31 | 3:14 | 4:29 | 7:48 | 8:50 |
| UL 94 V 1.5 mm evaluation | | V-1 | V-1 | V-1 | V-2 | n.d. |

TABLE 2-continued

Composition and properties of the moulding compositions

| | Unit | 5 (comp.) | 6 | 7 | 8 | 9 (comp.) |
|---|---|---|---|---|---|---|
| UL 94 V 1.5 mm total after-flame time | s | 120 | 113 | 95 | 32 | >170 |

It can be seen from Table 2 that the compositions of Examples 6 to 8 with 1%-2% ethylene-propylene-maleic anhydride copolymer achieve the object of the invention, i.e. a combination of good (notched) impact strength, flowability and chemical resistance, with a UL94V-1 or V-2 classification at 1.5 mm.

The invention claimed is:

1. A flame-retardant, thermoplastic moulding composition comprising:
   A) 50.0 to 90.0 parts by weight of at least one aromatic polycarbonate;
   B) 4.0 to 14.0 parts by weight of at least one graft polymer;
   C) 0.0 to 15.0 parts by weight of at least one vinyl (co) polymer;
   D) 1.0 to 20.0 parts by weight of at least one phosphorus-containing flame retardant;
   E) 0.5 to 5.0 parts by weight of at least one rubber-free anhydride-modified alpha-olefin terpolymer;
   F) 0.0 to 25.0 parts by weight of at least one filler; and
   G) 0.0-10.0 parts by weight of other additives;
   wherein said at least one rubber-free anhydride-modified alpha-olefin terpolymer possesses a molecular weight of from 2000 to 10,000 g/mol, and wherein the sum of the parts by weight of components A) to F) add up to 100 parts by weight.

2. The moulding composition according to claim 1, wherein said component
   E) comprises a proportion of from 1.0 to 2.0 parts by weight.

3. The moulding composition according to claim 1, wherein said component
   F) comprises a proportion of from 12.0 to 18.0 parts by weight.

4. The moulding composition according to claim 1, wherein said component
   G) comprises a proportion of 0.5 to 2.0 parts by weight.

5. The moulding composition according to claim 1, wherein said at least one rubber-free anhydride-modified alpha-olefin terpolymer includes an anhydride that is at least one selected from the group consisting of maleic anhydride, phthalic anhydride, fumaric anhydride and itaconic anhydride.

6. The moulding composition according to claim 5, wherein said anhydride is maleic anhydride.

7. The moulding composition according to claim 5, wherein said alpha-olefin terpolymer comprises at least one building block selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, and 1-nonadecene.

8. The moulding composition according to claim 5, wherein said rubber-free anhydride-modified terpolymer comprises:
   E1) 90.0-98.0 wt. % terpolymer; and
   E2) 2.0-10.0 wt. % anhydride.

9. The moulding composition according to claim 1, wherein said terpolymer consists of ethylene, 1-propylene and/or 1-octene building blocks.

10. The moulding composition according to claim 8, wherein, in an olefinic part E1) of the anhydride-modified terpolymer
    ethylene comprises 96.0-80.0 wt. %;
    propylene comprises 2.0-10.0 wt. %; and
    octene comprises 2.0-10.0 wt. %.

11. The moulding composition according to claim 1, wherein F) is present and talc is used as said at least one filler F).

12. The moulding composition in accordance with claim 1, wherein said phosphorus-containing flame retardant (D) is a flame retardant of formula (V)

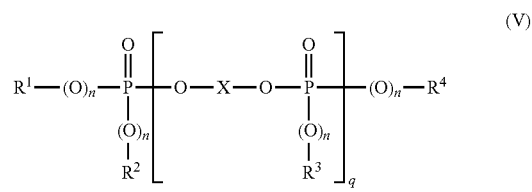

wherein:
$R^1$, $R^2$, $R^3$ and $R^4$, independently of one another, each denote optionally halogenated $C_1$ to $C_8$ alkyl, $C_5$ to $C_6$ cycloalkyl, $C_6$ to $C_{20}$ aryl or $C_7$ to $C_{12}$ aralkyl each optionally substituted by alkyl, optionally $C_1$ to $C_4$ alkyl, and/or halogen, optionally chlorine or bromine,
n independently of one another, denotes 0 or 1,
q denotes 0.80 to 5.00, and;
X denotes a mononuclear or polynuclear aromatic residue with from 6 to 30 C atoms or a linear or branched aliphatic residue with from 2 to 30 C atoms, which can be OH-substituted and comprise not more than eight ether bonds.

13. The moulding composition according to claim 1, capable of being used for producing a moulding.

14. A moulding produced from said moulding composition according to claim 1.

15. A moulding composition of claim 1, having at least one of the following properties: an impact strength ak (ISO 180/1A) 240° C./RT measurement of 16-17 kJ/m², a melt viscosity 260° C. [1000 s⁻¹] measurement of 157-131 Pas, a melt viscosity 260° C. [1500 s⁻¹] measurement of 126-109 Pas, a melt volume flow rate measured at 240° C. with a 5 kg load of 26-30 cm³/10 min, an environmental stress cracking test performed in toluene/isopropanol 60:40 with 2.4% outer fibre strain time to failure measurement of 3:14-7:48 min:sec, a fire behaviour in accordance with UL 94 V 1.5 mm evaluation classification of V-1 and/or V-2, or a fire behaviour in accordance with UL 94 V 1.5 mm total after flame time measurement of 113-32 s.

16. A moulding composition of claim 1, having at least one of the following properties: an impact strength ak (ISO 180/1A) 240° C./RT measurement of between 13 and 27 kJ/m², a melt viscosity 260° C. [1000 s⁻¹] measurement of between 163 and 91 Pas, a melt viscosity 260° C. [1500 s⁻¹] measurement of between 77 and 132 Pas, a melt volume flow rate measured at 240° C. with a 5 kg load between 24 and 31 cm³/10 min, an environmental stress cracking test performed in toluene/isopropanol 60:40 with 2.4% outer fibre strain time to failure measurement of between 2:31 and 8:50 min:sec, a fire behaviour in accordance with UL 94 V 1.5 mm evaluation classification of V-1 and/or V-2, or a fire behaviour in accordance with UL 94 V 1.5 mm total after flame time measurement of less than 120 s.

17. A flame retardant PC/ABS blend comprising an ethylene-propylene-octene-maleic anhydride copolymer.

* * * * *